Dec. 7, 1926.  
C. W. HALL  
1,609,468  
METALLIC CONSTRUCTION FOR AIRCRAFT AND THE LIKE  
Filed May 15, 1924     5 Sheets-Sheet 1
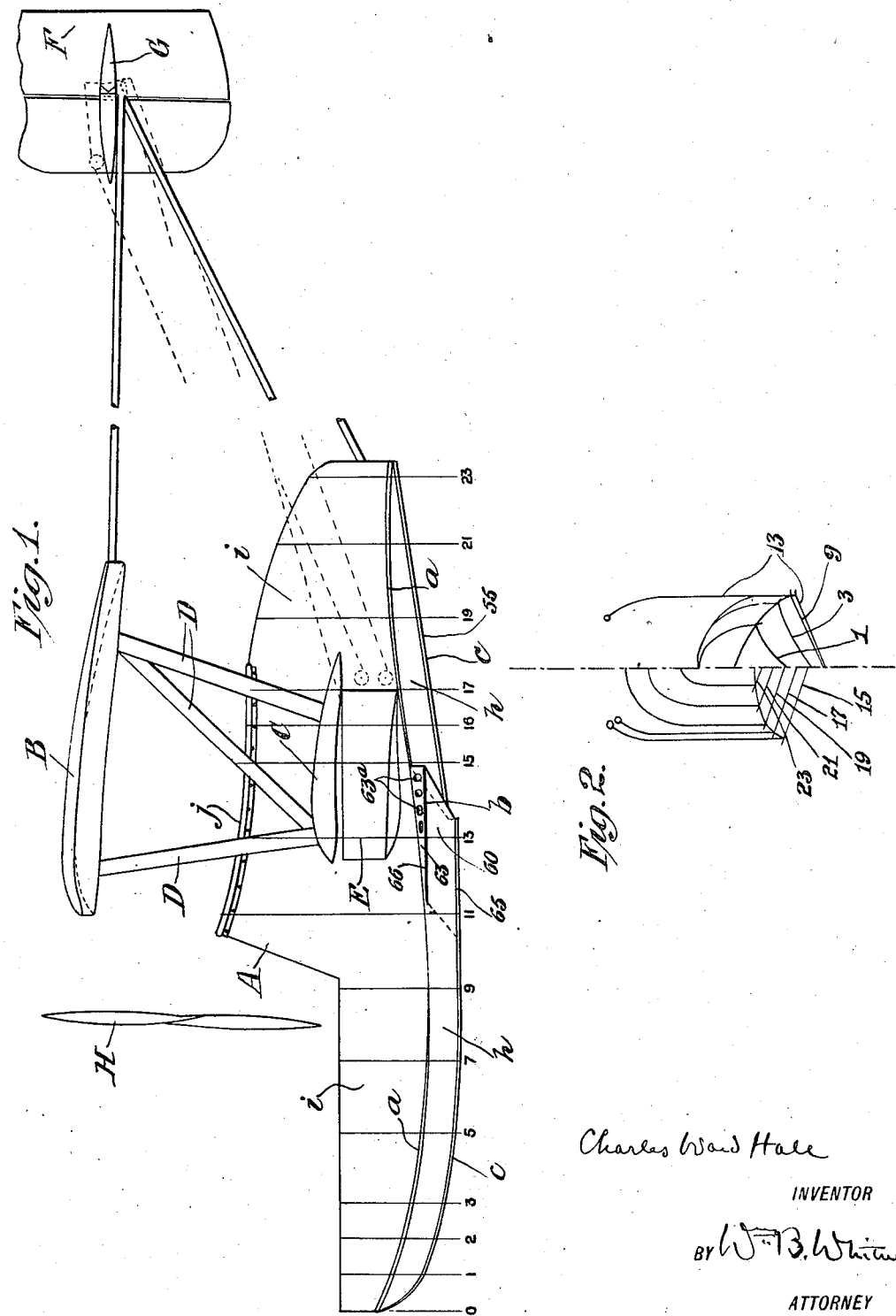
Charles Ward Hall
INVENTOR
BY W. B. Whitney
ATTORNEY

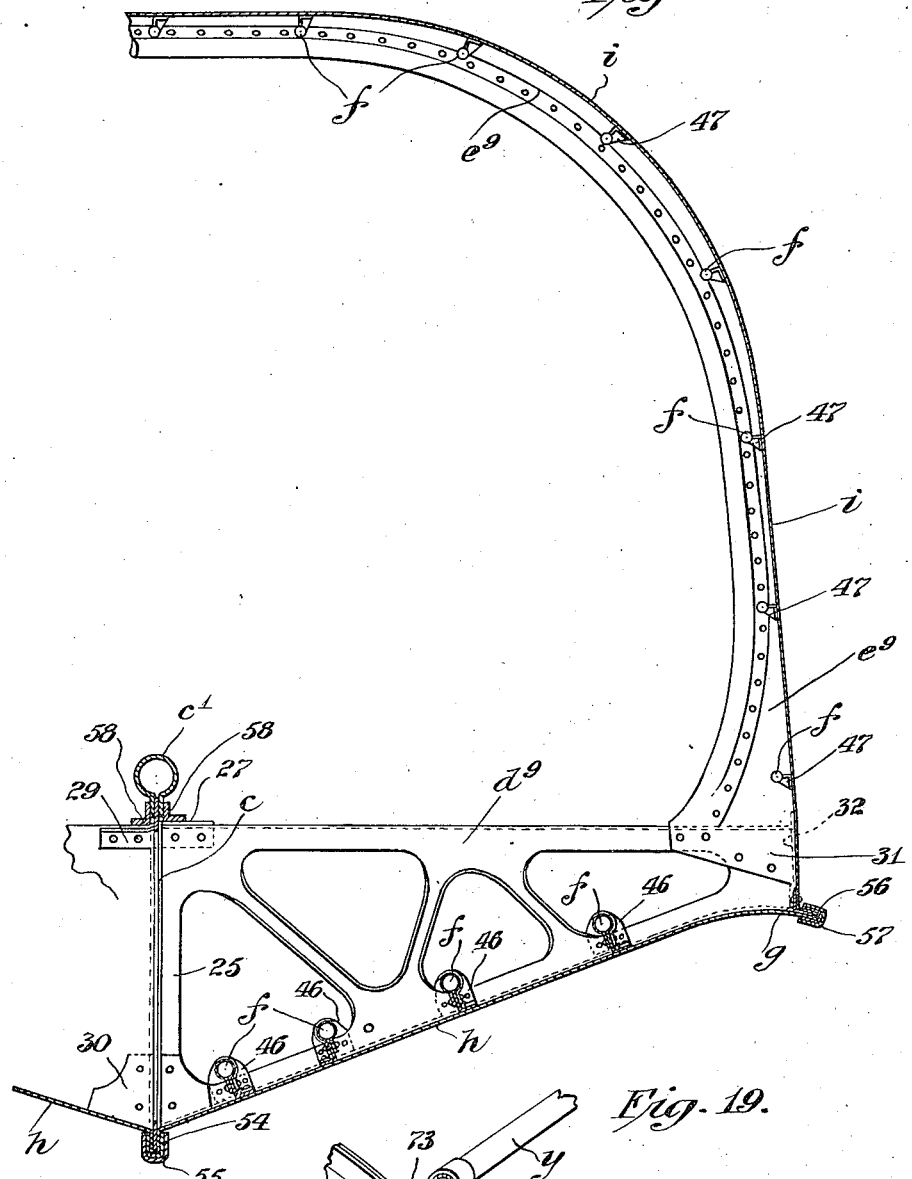
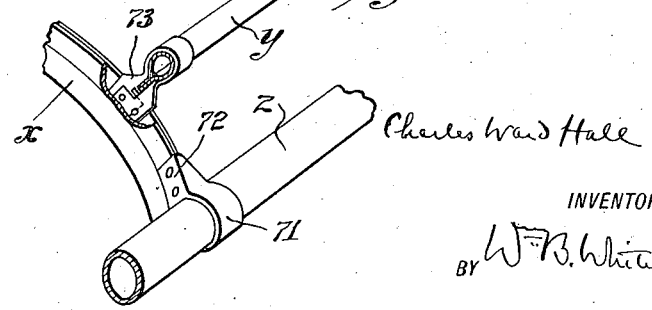

Dec. 7, 1926.　　　　　　　　　　　　　　　　1,609,468
C. W. HALL
METALLIC CONSTRUCTION FOR AIRCRAFT AND THE LIKE
Filed May 15, 1924　　　5 Sheets-Sheet 3
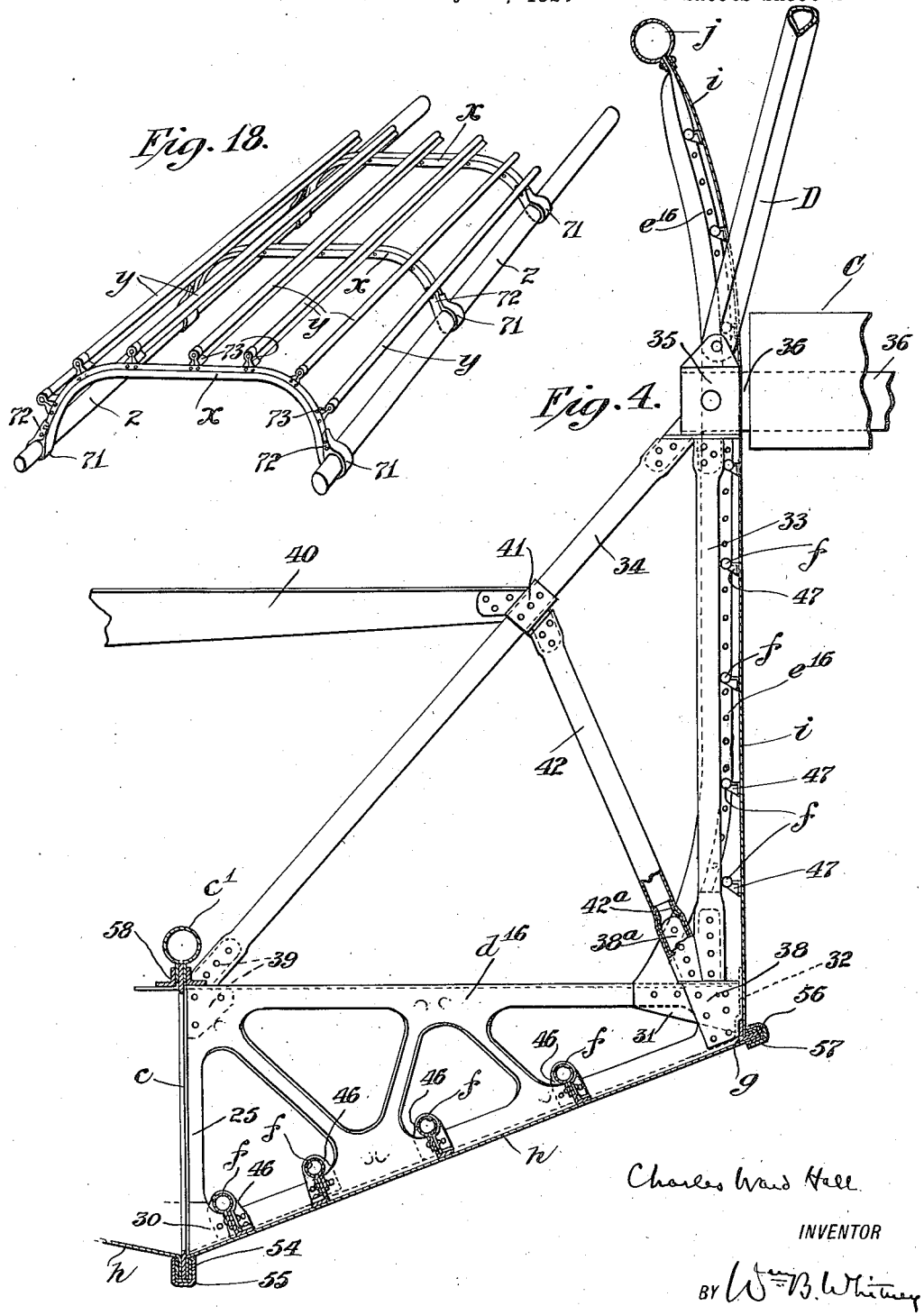

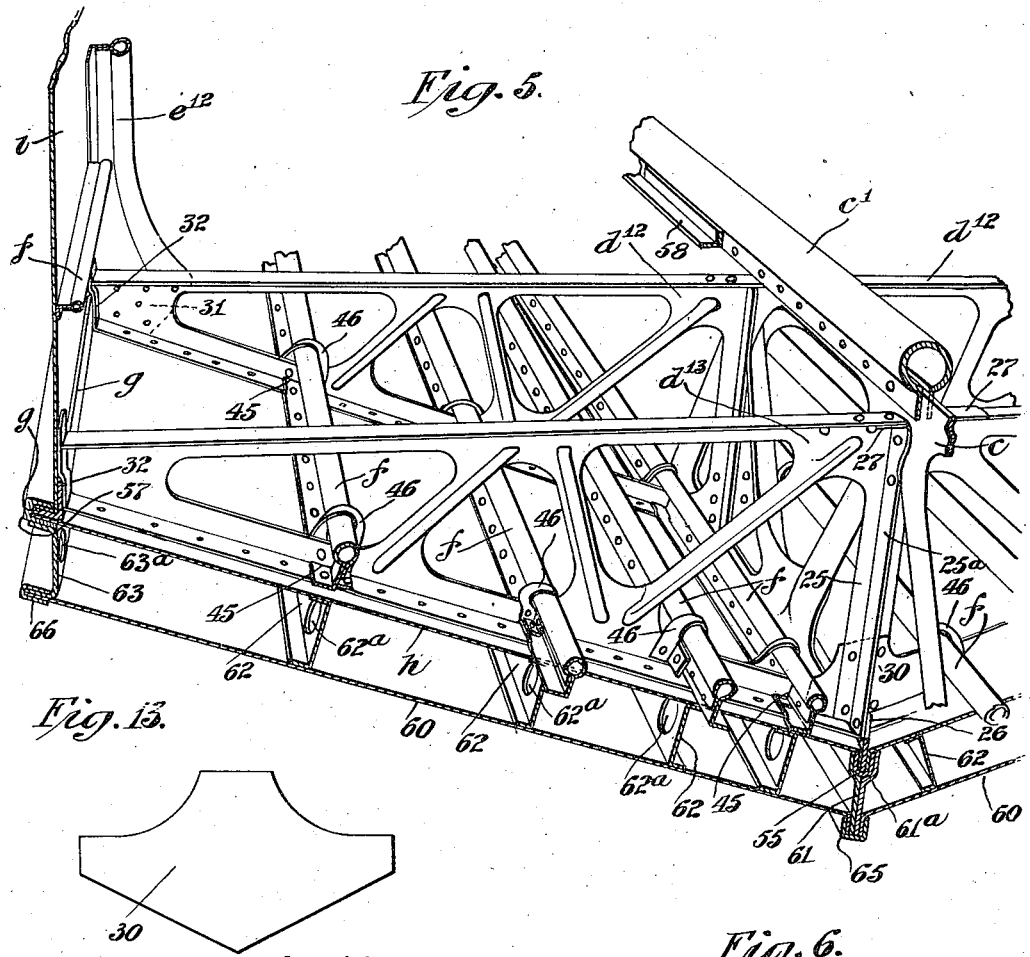

Dec. 7, 1926.
C. W. HALL
1,609,468
METALLIC CONSTRUCTION FOR AIRCRAFT AND THE LIKE
Filed May 15, 1924    5 Sheets-Sheet 5
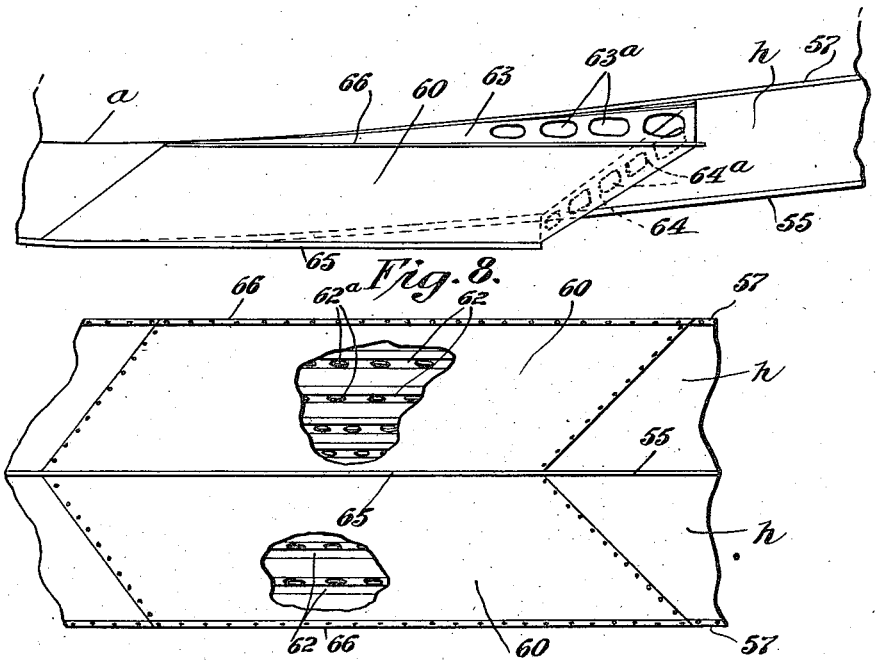
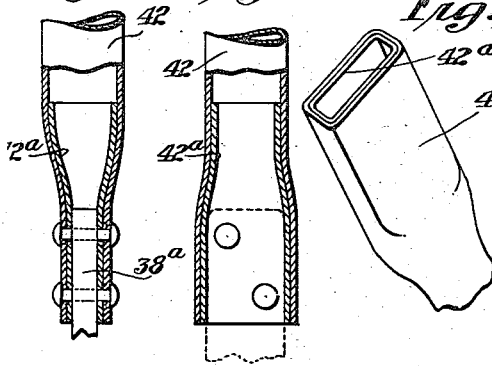
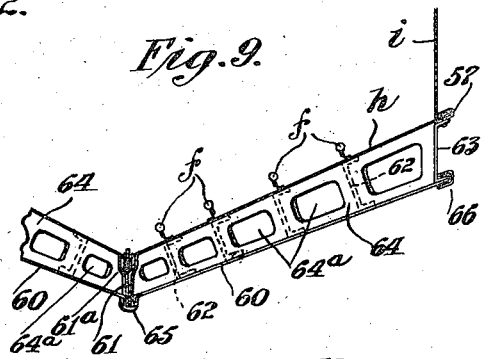
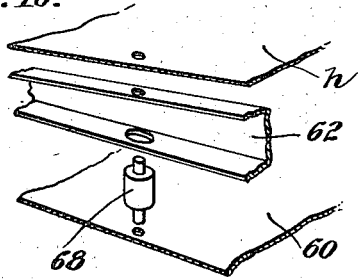
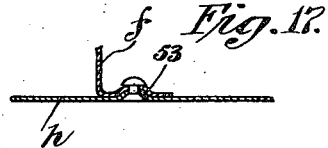
Charles Ward Hall
INVENTOR
ATTORNEY Patented Dec. 7, 1926.

1,609,468

UNITED STATES PATENT OFFICE.

CHARLES WARD HALL, OF LARCHMONT, NEW YORK.

METALLIC CONSTRUCTION FOR AIRCRAFT AND THE LIKE.

Application filed May 15, 1924. Serial No. 713,564.

My present invention relates to a system of construction in which sheet metal, preferably duralumin or other suitable aluminum alloy, is largely employed; and the object thereof is to provide structural combinations and details, of special value in the construction of aircraft of all kinds, whereby a maximum of strength and rigidity is secured with a minimum amount and weight of material.

To this end the invention comprises, as perhaps its principal feature, a system of metallic construction in which a series of frames is intersected by a series of stringers, either or both with open lattice or solid webs and with open or closed hollow chords as best suited to the purpose, which are so combined that the chords or flanges at least of both series are fully continuous.

For all enclosed parts such as the wings of airplanes, their fuselages, and particularly the hulls of seaplanes and of light racing hydroplanes, the main elements of this framework are wholly on one side and and are covered by a skin of thin sheet metal which is attached to the chords or flanges of the stringers, or of both stringers and frames, and is not only rigidly supported thereby but itself serves as a structural element contributing to strength and rigidity. Moreover, such frame supported structural skin may be employed to provide a watertight flooring and interior bulkheads so disposed as to render the hull non-sinkable.

A further feature, applicable alike to the hulls of hydroplanes and of flying boats, is a slightly projecting non-displacement chine, which forwardly is projected downwards but amidships or aft thereof lies substantially in the plane of the bottom surface and so operates even at comparatively low speeds as to clear the top sides of water, thus eliminating the large resistance otherwise due to skin friction thereon, and further makes effective the ventilation of the step next referred to.

Another feature, also applicable both to hydroplanes and to flying boats, is an outer or planing bottom which is applied to the hull amidships, without interrupting the continuity of the bottom skin, and which at its rear forked end forms a V-shaped step having a slight break at the keel and a larger break at the chines and so serving to materially reduce the natural tendency of the boat to porpoise when planing. In the construction preferred, the skin of this outer planing bottom, removably or permanently secured in place, is supported by a false keel, false stringers, and sides or chine extensions which taper to a feather edge forward and are attached to the bottom outside the bottom skin, and the step is ventilated without piercing the bottom skin by openings provided in the false stringers and chine extensions.

Still further features are found in the various novel structural details hereinafter described and particularly pointed out in the appended claims.

The invention is shown, by way of illustration and not of limitation, in the accompanying drawings, in which—

Figure 1 is a view, largely diagrammatic, showing in side elevation a flying boat in which are embodied the several features of my invention, the vertical lines 1 to 23 indicating the spaced positions of the transverse frames of the hull: Fig. 2 is a view showing in conventional manner the half contour lines of the hull at the correspondingly numbered frame positions indicated in Fig. 1; Fig. 3 is a vertical transverse section, enlarged, showing one-half of the hull at the frame position 9; Fig. 4 is a sectional view, similar to Fig. 3, taken at the frame position 16; Fig. 5 is a detail, amidships of the hull, showing in perspective portions of the bottom framework, bottom skin, and outer planing bottom; Fig. 6 is a perspective view, further enlarged, of parts shown in Fig. 5; Figs. 7, 8 and 9 are views showing, in side elevation, in plan from below, and in half rear elevation on an enlarged scale, the planing bottom which is applied to the bottom of the hull amidships and at its rear end forms a step; Figs. 10, 11 and 12 are enlarged details showing, in the first two views in longitudinal sections at right angles to each other and in the last in perspective, an end of a tubular strut or brace reinforced and shaped for attachment to a lug on a joint fitting; Fig. 13 is a plan or face view of a plate or gusset used to join the lower chords of starboard and port bottom frame pieces; Figs. 14 and 15 are perspective views showing a blank for and a shaped clip used to tie together the bottom frames and stringers at their points of intersection; Fig. 16 is a detail showing, in perspective, detached parts of the hull bottom and outer planing bottom and the way in which they may be joined; Fig. 17 is a detail, in section, at a point of attachment of the skin to the flange of a frame member; Fig. 18 is a perspective view of a portion of a slightly modified framework, comprising frames and stringers, for a turtle back or fairing to carry the stream lining of a fuselage; and Fig. 19 is a detail, also in perspective, of such modification.

The same reference characters indicate like parts throughout the several figures of the drawing.

The flying boat here illustrated comprises a stepped hull A, upper and lower wings B and C, interwing struts D D, floats E attached to the outer end of the lower wing on each side of the machine, and an empennage carrying the usual vertical fin and rudder F and horizontal stabilizer and elevators G.

The hull, which except for the cockpit opening is entirely enclosed by a skin of sheet metal, is cut down abruptly immediately in front of the cockpit, to accommodate the traction propeller H. The bottom (Figs. 1 and 2) sheers upwardly at the bow, is of a V-section which is rather sharp at the bow with gradually decreasing deadrise to about frame 9 and thence continues at constant angle to the stern, and has on each side a chine projection $a$ which at the bow extends downwardly and then is gradually twisted outwardly and upwardly until, somewhat forward of amidships, it lies in the plane of the bottom and so continues to the stern; and to the bottom is applied, amidships, the outer planing bottom $b$ of special design which at its rear end provides the step.

The hull is framed by a keel $c$, a series of thwartships frames, spaced preferably about eight or nine inches apart, each of which comprises starboard and port bottom pieces $d^1$ $d^1$ to $d^{23}$ $d^{23}$ and starboard and port top side pieces $e^1$ $e^1$ to $e^{23}$ $e^{23}$ (a few only being shown), a series of longitudinal stringers $f$ $f$ which extend along both the bottom and the top sides of the hull, and starboard and port chine strips $g$ $g$; and the plating or skin which covers the framework comprises starboard and port bottom sections $h$ $h$ and starboard and port top side (and, fore and aft, deck) sections $i$ $i$.

The keel $c$, extending throughout the length of the body, is shaped up from sheet metal into the form of a lattice truss, with diagonal web members of open hollow section supported on the chords by tapering fillet ends and upset to avoid eccentric loading, all substantially as shown and described in earlier Patents Nos. 1,431,520 and, particularly, 1,431,521, both bearing the date of October 10, 1922. Its upper tubular chord or keelson $c^1$ is preferably, as shown, shaped up as a separate piece and secured in place by rivets. The entire lower chord is in the plane of the web, except for the bottom skin and cover strip, which act as parts thereof.

The thwartships frames are of the same general construction throughout, but vary more or less in size and shape from one position to another. The two bottom halves of each frame are substantially alike and, at least in the case of the wider frames amidships, are of a lattice truss construction similar to that of the keel. They are triangular in shape and at their deep inboard ends are joined together and to the keel, their upper and lower flanged chords extending outwardly the former horizontally and the latter at an upward angle which varies at the different frame positions to give the desired V angle to the hull bottom. Thus, referring to the two bottom frame pieces $d^{13}$ $d^{13}$ (Figs. 5 and 6) as typical, a vertical web member 25 at the inboard end of each is bent to provide a flange $25^a$, extending forward on one side and aft on the other, which at its upper end is riveted to the integral fillet ends of two web members of the keel and at its lower end to integral lugs 26 of the keel chord; and the upper chords of the two pieces are joined both by flange extensions 27 which, passed through a horizontal slot 28 in the web of the keel, overlap and are riveted the extension of one to the flange of the other piece and by a narrow plate 29 which passes through a vertical arm of the slot 28 and is riveted to the vertical part of the chords of both pieces (see Fig. 6), while their lower chords are joined by a plate or gusset 30 (see Fig. 13) which is riveted to the web member 25 and to the vertical part of the chord of each. The top side (and deck) pieces of the frames are sheet metal hollow bulb angles and have an outer flange, a tubular inner bulb and a solid web, the inner bulb being curved inwardly and flattened and the web of gradually increasing depth at the lower end and at the haunches; and in each frame the lower ends of the top side pieces are secured each to the outer end of a bottom piece by riveting together overlapping portions of their webs, as at 31, and further, if desired, by joining a bent extension 32 of the web of the bottom piece (see Fig. 5) to the flange of the top side piece. Through those portions of the body fore and aft of the cockpit, where the hull is decked over, the two top side pieces are preferably integral (see $e^9$, Fig. 3,) extending continuously from chine to chine. Amidships, throughout the length of the cockpit, the top sides of the frames, as $e^{16}$ illustrated in Fig. 4, extend straight up for somewhat more than half their length and thence at a slight inward inclination to their upper ends, which are joined, in any suitable manner, to a flanged tubular coaming $j$ surrounding the cockpit. This coaming may be readily covered with soft padding (not shown), and is also adaptable for the cockpit coaming of fuselages generally without the attached elements of metal framework and skin. Through the amidships portion of the hull, and particularly at the roots of the lower wing spars, the frames are stiffened and strengthened by a triangular system of bracing (Fig. 4) comprising the upright and diagonal tubular struts 33 34 which at their upper ends are joined to a fitting 35, carrying the root of the lower rear spar 36, the interplane strut D, etc., and at their lower ends are respectively joined, by fittings 38 and 39, to the outer and inner ends of a bottom frame piece, as $d^{16}$, and a horizontal tie-bar 40 which at each end is joined, by a fitting 41, to a strut 34 and to the upper end of a secondary strut 42 the lower end of which is joined to the fitting 38. For the attachment of the struts to the fittings—the strut 42 to the fitting 38, for example—or, for the attachment of any tubular member with thin walls, the manner preferred (see Figs. 10–12) is to insert a short length of a reinforcing tube $42^a$ in the end of the strut and then to flatten it to receive telescopically a lug $38^a$ of the fitting, to which the reinforced and shaped end is riveted, all being preferably a close or force fit.

The longitudinal stringers $f$ $f$ are each shaped up from a single strip of sheet metal to hollow bulb angle form, with outer flange, inner tubular bulb, and solid web. Along the bottom of the hull the stringers, spaced more closely together near the keel than near the chines, are at each frame position slotted or cut through the flange and web to straddle the vertical part of the chord of the frame member, as at 45 45, Fig. 5; and at each intersection of a stringer and frame piece their flanges are riveted together and the parts are further bonded by a clip 46 of special design (see Figs. 14, 15), which, twisted diagonally over the bulb of the stringer is riveted at its ends both to the web of the stringer and to the chord of the frame piece on opposite sides of the latter. At the top sides, and along the decks, the stringers, of somewhat smaller size than the bottom stringers, are passed through shaped openings 47 47 provided therefor in the web of the frame pieces and, at the intersections, their flanges are riveted to the flanges of the frames. In all cases the tubular inner bulbs of the stringers are continuous throughout. At the intersections the flanges of the stringers are upset, to pass over the flanges of the frame pieces, but as the sheet metal of which all parts are made is quite thin the upsetting required is very slight.

The two chine strips $g$ $g$ are attached, one on each side of the hull, to the ends of the bottom frame pieces, as by riveting them to the bent outboard ends 32 of the webs of the bottom frame pieces; and the projecting outer half of each is shaped to the desired angle. Thus, as stated, the chine projections extend nearly vertically downward at the bow and thence gradually twist outwardly and upwardly until, at the fore end of the planing bottom at about the tenth frame, they lie in the plane of the bottom and continue in this position to the stern.

The skin sections $h$ $h$ and $i$ $i$, suitably shaped, are secured in place by riveting them to the flanges of the stringers, and also, if desired, to the flanges of the frame pieces; and, to provide a smooth outer surface, the rivets are countersunk (see Fig. 17) by upsetting the flanges of the stringers and the skin around the rivet holes, as at 53, to form cup-shaped depressions adapted to receive the rivet heads. The adjacent inner edges of the two bottom skin sections $h$ $h$ are flanged outwardly, along the sides of the keel, and extend downwardly to its lower edge forming garboard strakes; and a watertight joint is there formed by first folding over the bottom edge of the keel, under the skin, a packing strip (not shown) and over the edges of skin and keel a second packing strip 54, of rubberized cloth or other suitable material, and then slipping over this outer packing a U-shaped cover 55 and riveting it, through packing and skin, to the keel, forming thereby a slight downwardly projecting keel fin. Similarly, at the chines, the adjoining edges of a bottom section $h$ and a side section $i$ of skin are fitted to the sides of the projecting outer half of the chine strip, over which is a packing strip (not shown), similar to that on the keel, and over an outer packing strip 56 a U-shaped cover 57 is fitted and riveted in place. Around the cockpit opening the upper edge of the skin is riveted in place between the downwardly projecting flanges of the flanged tubular coaming $j$, within which are also inserted the flattened ends of the top side frame pieces.

Flooring plates (not shown) may be supported, where required, upon the upper flanges of the bottom frame pieces and the flanges of angle strips 58 secured to the sides of the keel. Or, by attaching to the upper chords of the bottom frame pieces a series of inverted stringers and covering them with an inner skin, substantially in the same way that the bottom stringers are attached and are covered with the outer skin, a complete watertight flooring may be provided, thereby converting the bottom of the hull into a watertight compartment which will render it practically nonsinkable.

The outer planing bottom, of a V-section conforming substantially to that of the bottom of the hull and forked at its rear end, if formed (see Figs. 5 and 7–9), and in turn forms the steps, by two flat surfacing or skin sheets 60 60 which are secured to and supported by a false keel 61, false stringers 62 62, and two false chine strips 63 63, all tapering to a feather edge forward, and two channel-shaped rear supports 64 66 extending from the sides of the keel diagonally outward and aft across the bottom. The false keel consists of two relatively thick plates which along their upper edges are outwardly upset, at 61$^a$, to straddle the keel cover strip 55 and are, or may be, secured to the keel by the same rivets which are used to form the keel joint. The interior false stringers, flanged top and bottom and ventilated by openings 62$^a$, are preferably placed immediately below the stringers and may be secured thereto by passing through their upper flanges the rivets used to rivet the bottom skin to the stringer flanges. Each of the two false chine strips, which are also flanged top and bottom and ventilated by openings 63$^a$, may be secured in place by riveting its upper flange to the chine cover strip 57. The two skin sheets, riveted or screwed at their forward ends to the bottom skin of the hull, are downwardly flanged along the false keel and these flanged edges and an enclosing U-shaped cover 65 are riveted or screwed to the lower edge of the false keel, while each at its outboard edge is riveted or screwed to the bottom flange of a false chine piece, the edges being enclosed in a cover 66, and forms therewith a secondary chine projection. No packing is required in these lower joints, since they need not be watertight. Near the forward end of the planing bottom, where the depth is insufficient to permit of the use of a riveting tool, the parts may be assembled and joined, as illustrated in Fig. 16, by short posts 68 with reduced ends which serve as rivets, the upper end to secure the upper flange of a false chine step, or intermediate false stringer, to the bottom framework of the hull and the lower end to secure in place the skin of the planing bottom; or the lower ends may be tapped to receive screws in case it is desired to make this outer skin removable for cleaning or for painting. The two rear supports, ventilated by openings 64$^a$, form at the keel an acute re-entrant angle and, as they extend outwardly and aft therefrom, are of gradually increasing depth. They may be secured in place in any suitable manner, as by riveting or screwing their flanged upper and lower edges to the skin of the hull and of the planing bottom respectively.

By the construction described I am able, using thin sheet duralumin or other suitable alloy of aluminum throughout, to produce a stepped boat body which not only possesses ample strength but is exceedingly light and efficient in operation. For example, the fifteen foot hull of a two-seater flying boat of the type illustrated, carrying when equipped a sixty horse-power engine, weighs complete only sixty pounds. The shape of the bottom and of the slight chine projection on each side, which as described is nearly vertical at the bow but amidships and aft thereof projects outwardly and upwardly substantially in the plane of the bottom, serves even at comparatively low speeds both to clear the top sides of the hull of water and thereby to largely eliminate the resistance otherwise due to skin friction thereon and also to make effective the ventilation of the step. And, further, the planing bottom, applied to the bottom of the hull and ventilated at the sides and aft without piercing the bottom skin, forms by reason of its forked rear end a step with a slight break at the keel and a larger break at each chine—a construction which serves materially to reduce the tendency of the boat to porpoise when planing.

In the modified framework or turtle back illustrated in Figs. 18 and 19, flanged tubes are used both for the frames and for the stringers. The frame tubes $x$ $x$ are curved to the desired faired cross-section of the fuselage, with their flanges extending outwardly, and are secured at their ends to longérons $z$ $z$—as shown, by cutting away the flanges and a portion of the tube at each end and flattening the remainder, at 71 for a length just sufficient to enclose a longéron and at the tip 72 to straddle (or to be inserted between) the flanges of the curved frame, and then, after drawing such flattened length tightly around the longéron, riveting the tip to the flanges. The stringers, over which a fabric covering is to be stretched, are secured to the frames, with their flanges extending inwardly, by special clips or straps 73, somewhat similar to the clip 46. At each intersection, a clip is bent around the tube of the stringer and riveted to its flanges, and its ends, shaped and bent, are inserted between and riveted to the flanges of a frame. It is to be noted that here, also, both frames and stringers are not cut away but are fully continuous through their intersections.

This construction is exceptionally light and very strong. Thus, as exemplified in a single-seater combat plane recently built, such a turtle back of duralumin, with frames (having tubes of three-eighths inch diameter) spaced nine inches apart and with stringers spaced three inches apart, weighs three pounds and two ounces and supports without injury a heavy man seated thereon, whereas for a like plane a wooden turtle back of the usual type weighs about twelve pounds and must be treated with care to avoid breaking.

While I have described the several parts as joined by rivets, I have done so simply because I prefer to use rivets for joining together parts made of duralumin, which cannot be spot-welded, and it will be understood that any other means adapted to the material used may be employed.

It is evident that the main structural features of my invention, the metallic framework rigidly supporting and in turn strengthened by a metallic skin, is adapted with slight changes to the construction of the fuselages and wings of airplanes and, generally, of the framed and enclosed parts of all classes of aircraft.

It is also to be understood that the several features of the invention may be variously modified in their details and that one or more of these features may be used without the others, within the scope of the appended claims, without departing from the spirit or sacrificing the advantages thereof.

What I claim as new, and desire to secure by Letters Patent, is—

1. A metallic framework for aircraft and the like which comprises a series of sheet metal frames, of truss structure where most heavily loaded, spaced relatively far apart and, supported thereby, a series of hollow sheet metal stringers placed relatively near each other.

2. A light metallic framework for aircraft and the like which comprises a series of sheet metal frames and a series of sheet metal stringers of hollow section which pass through the web space of the frames without cutting their chords and are continuous throughout their length.

3. A metallic framework for aircraft and the like which comprises a series of sheet metal frames and of sheet metal stringers, the relatively deep frames having flanged outer chords and the shallower stringers having tubular inner and flanged outer chords, and in which the flanged outer chords of the frames are continuous and the outer flanges of the stringers are substantially in the plane of the flanges of the frames and are bonded thereto and their tubular inner chords are carried through the web portions of the frames and are continuous throughout.

4. A metallic frame construction for aircraft and the like, comprising a series of sheet metal trusses with flanged outer chords and a series of sheet metal stringers with flanged outer and tubular inner chords which intersect the frames, the outer flange of the stringers substantially flush with that of the frames, and which at each intersection are bonded to the frame by a clip passed diagonally over the tubular inner chord of the stringer and joined at its ends, on opposite sides of the frame, to both stringer and frame, the flanged outer chords of the frames and the tubular inner chords of the stringers at least being continuous at the points of intersection.

5. In a metallic construction of the character described, a framework comprising a series of sheet metal frames and a series of sheet metal stringers both of which are continuous throughout, the stringers being of hollow bulb section and bonded to the frames by clips encircling the bulbs and secured to the frames.

6. In a framed and at least partially enclosed structure of the character described, a sheet metal framework which comprises a series of frames with central bottom portion of truss structure spaced relatively far apart and a series of hollow bulb angle stringers spaced relatively close together and supported by the frames and an outer structural skin which is secured to such framework.

7. In a metallic construction for aircraft and the like, the combination of a series of main truss frames of sheet metal with flanged outer chords, a series of sheet metal stringers with inner tubular and outer flanged chords which intersect the frames, the outer flange of each stringer substantially flush with the outer flanges of the frames and bonded thereto, without break in the continuity either of the outer chords of the frames or the inner chords of the stringers, and a structural sheet metal skin which is rigidly joined to the outer flanges of the stringers.

8. In a metallic construction of the character described, the combination of a series of main frame trusses with flanged outer chords, a series of secondary frame members of sheet metal having tubular inner chords which extend through web openings in the frames and are continuous throughout and flanged outer chords which intersect and are bonded to the flanged outer chords of the main frames in manner to leave the flanges of the two parts substantially flush and not to break the continuity of the chords of the main frames, and a structural skin of sheet metal which is attached to the flanges of the secondary frame members at least and which covers the outside of the framework.

9. A boat which is framed by a keel of truss structure, bottom frames of truss structure, and stringers attached to the frames within their outer flanges and wihout loss of continuity.

10. A boat which is framed by a keel of truss structure, bottom frames of truss structure, top side and deck frames of hollow bulb angles, and stringers attached to the frames, all connected together without loss of continuity.

11. A boat which is framed by a keel of truss structure, frames in part at least of truss structure, and stringers attached to the frames, and is enclosed by a smooth structural skin attached to the stringers.

12. A boat of the character described, which is framed by a keel, shaped frames and stringers, all of sheet metal, and is covered with a skin of sheet metal secured to the framework and joined, along the keel and at the chines, in manner to form a slight downwardly projecting keel fin and slight chine fins projecting downwardly at and near the bow and amidships and aft thereof projecting outwardly in the plane of the bottom.

13. A framed structure of the character described having a bottom which amidships provides a planing surface terminating in a step with a slight break at the keel and a greater break at the chines.

14. A framed and at least partially enclosed boat having a sharp cut-water forward and, amidships, a planing bottom terminating in a step of V-shape deeper at the chines than at the keel.

15. A framed and enclosed boat body of the character described having a bottom of V-section and amidships a rearwardly facing step forming at the keel a re-entrant angle and providing a slight break thereat and a greater break at the chines.

16. A frame and at least partially enclosed structure of the character described having a sharp cut-water bow, a bottom of V-section which amidships provides a planing surface terminating at its rear end in a ventilated step deeper at the chines than at the keel, the angle of the V-bottom gradually changing to provide a gradually decreasing dead-rise from the stem to the forward end of the planing surface and thence to the stern remaining constant.

17. A framed and at least partially enclosed structure of the character described having a sharp cut-water bow, a planing bottom amidships, and chine projections which are nearly vertical at the bow and are gradually flared outwardly until at the forward end of the planing bottom they lie in the plane thereof.

18. A framed and at least partially enclosed boat body of the character described having a bottom of V-section sheering upwardly at the bow and slight chine projections which at and near the bow extend downwardly and thence gradually shift outwardly and upwardly to the angle of the bottom and continue thereat to the stern.

19. A boat of the character described having a bottom covered by a continuous skin and applied thereto amidships an outer skin which forms a planing bottom terminating in a step ventilated laterally and aft below the inner continuous skin.

20. A boat of the character described having a bottom covered by a continuous skin and applied thereto amidships an outer skin which forms a planing bottom terminating in a step and is supported by a series of tapering pieces extending fore and aft between the two skins and provided with ventilating openings.

21. A boat of the character described having a bottom of V-section sheering upwardly at the bow, chine projections which at and near the bow are nearly vertical and which gradually shift outwardly and upwardly until amidships they lie in the plane of the bottom and thence continue therein to the stern, and a planing bottom which is applied to the boat bottom amidships and has a forked rear end providing a step of V-shape with a greater break at the chines than at the keel.

22. A boat of the character described having a framed bottom of V-section sheering upwardly at the bow and covered by a skin of sheet metal which is secured to the frame and joined along the keel and chines in manner to provide a slight downwardly projecting keel fin and slight chine fins projecting downwardly at and near the bow and amidships gradually shifting outwardly and upwardly to the plane of the bottom and continuing therein to the stern.

23. A framed and enclosed boat body of the character described which has a bottom of V-section sheering upwardly at the bow and covered by a skin of sheet metal jointed along the keel and chines in manner to provide a downwardly projecting keel fin and chine fins projecting downwardly at the bow and amidships and aft thereof projecting outwardly in the plane of the bottom, and, applied to the bottom amidships, an outer planing bottom with a forked rear end forming a step which has a larger break at the chines than at the keel and is ventilated without piercing the bottom skin.

24. In a boat of the character described, a sheet metal framework which comprises shaped frames providing a bottom of V-section and stringers, a skin of sheet metal which is secured to and encloses the framework and is jointed at the chines in manner to form fin projections extending downwardly at the bow and amidships and aft thereof extending outwardly and upwardly in the plane of the bottom, and a planing bottom of V-section which is applied to the boat bottom amidships and has a forked rear end forming a step with a slight break at the keel and a larger break at the chines.

25. A metallic construction for a flying or similar boat which comprises a keel of sheet metal, a series of shaped sheet metal frames which are joined to the keel on either side thereof and have flanged outer edges, a series of sheet metal stringers which have tubular inner and flanged outer edges and which intersect the frames, their tubular inner edges being continuous and passing through the web portions of the frames and their flanged outer edges being substantially flush with the flanged outer edges of the frames and bonded thereto, and a skin of sheet metal which is secured to the sides of the keel along its bottom edge and to the flanged outer edges of the stringers and which encloses the framework.

26. In sheet metal construction of the character described, a riveted joint wherein two overlapped sheets are joined by rivets set in holes formed in the bottom of conical offsets which are stamped in both sheets and are nested together the projecting portions of the offsets of one sheet within the depressions formed by the offsets of the other plate, the rivet heads being countersunk in the depressions formed by the offsets of the first plate.

27. A sheet metal construction of the character described which comprises a frame member and a skin riveted thereto and in which the rivet heads are countersunk, on the outer surface of the skin, in depressions formed by upsetting both skin and frame member around the rivet holes.

28. In a metallic construction of the character described and comprising a structural tubular member with thin walls, an end joint for such tubular member in which the end of the tube is reinforced by the insertion therein of a tightly fitting length of tubing and is then flattened and the reinforced and shaped end is riveted to a lug on a joint fitting telescopically inserted therein.

CHARLES WARD HALL.